US010908385B2

(12) United States Patent
Ooya

(10) Patent No.: US 10,908,385 B2
(45) Date of Patent: Feb. 2, 2021

(54) MECHANISM FOR ATTACHING AND DETACHING TRIPOD SEAT

(71) Applicant: RICOH IMAGING COMPANY, LTD., Tokyo (JP)

(72) Inventor: Takahiro Ooya, Kanagawa (JP)

(73) Assignee: RICOH IMAGING COMPANY, LTD., Tokyo (JP)

( * ) Notice: Subject to any disclaimer, the term of this patent is extended or adjusted under 35 U.S.C. 154(b) by 87 days.

(21) Appl. No.: 15/536,410

(22) PCT Filed: Dec. 22, 2015

(86) PCT No.: PCT/JP2015/085763
§ 371 (c)(1),
(2) Date: Jun. 15, 2017

(87) PCT Pub. No.: WO2016/104470
PCT Pub. Date: Jun. 30, 2016

(65) Prior Publication Data
US 2017/0336595 A1   Nov. 23, 2017

(30) Foreign Application Priority Data

Dec. 26, 2014 (JP) ................................. 2014-264610
Dec. 26, 2014 (JP) ................................. 2014-264611
(Continued)

(51) Int. Cl.
*G02B 7/14*    (2006.01)
*F16M 11/04*   (2006.01)
*G03B 17/56*   (2021.01)

(52) U.S. Cl.
CPC .............. *G02B 7/14* (2013.01); *F16M 11/041* (2013.01); *G03B 17/561* (2013.01); *G03B 17/566* (2013.01)

(58) Field of Classification Search
CPC ...... F16M 11/041; G02B 7/14; G03B 17/561; G03B 17/566
See application file for complete search history.

(56) References Cited

U.S. PATENT DOCUMENTS 6,791,770 B2 *   9/2004   Yamazaki ................ G02B 7/02
359/819

FOREIGN PATENT DOCUMENTS

EP    2708791       3/2014
JP    2003-337275   11/2003
(Continued)

OTHER PUBLICATIONS

International Search Report, along with English-language translation thereof, issued in PCT/JP2015/085763, dated Feb. 9, 2016.
(Continued)

Primary Examiner — Joseph P Martinez
(74) Attorney, Agent, or Firm — Greenblum & Bernstein, P.L.C.

(57) ABSTRACT

A mechanism for attaching and detaching a tripod seat, comprising: a first tripod seat unit; and a second tripod seat unit to which the first tripod seta unit is detachably attached, wherein: one of the first tripod seat unit and the second tripod seat unit has a first fixing member and a second fixing member formed to be screwed together; the other of the first tripod seat unit and the second tripod seat unit has an attachment part brought to be in pressure contact with the second fixing member by screwing the first fixing member to the second fixing member; and by bringing the attachment part to be in pressure contact with the second fixing member, the first tripod seat unit is fixed to the second tripod seat unit.

20 Claims, 10 Drawing Sheets

(30) Foreign Application Priority Data

Mar. 17, 2015 (JP) .................................. 2015-053983
Mar. 17, 2015 (JP) .................................. 2015-053984

(56) References Cited

FOREIGN PATENT DOCUMENTS

| JP | 2005-90730 | 4/2005 |
|----|------------|--------|
| JP | 3163056 | 9/2010 |
| JP | 2012-207794 | 10/2012 |

OTHER PUBLICATIONS

Written Opinion of the International Searching Authority, along with English-language translation thereof, issued in PCT/JP2015/085763, dated Feb. 9, 2016.

International Preliminary Report on Patentability issued in PCT/JP2015/085763, dated Jun. 27, 2017.

Office Action issued in Japan Counterpart Patent Appl. No. 2015-053983, dated Nov. 30, 2018, along with an English translation thereof.

* cited by examiner

MECHANISM FOR ATTACHING AND DETACHING TRIPOD SEAT

TECHNICAL FIELD

The present invention relates a mechanism for attaching and detaching a tripod seat which is detachably attachable to an image capturing apparatus or a lens barrel.

BACKGROUND ART

An image capturing apparatus of a type configured such that an imaging lens is exchangeable. An imaging lens includes a lens barrel and lenses disposed in the lens barrel. The sizes and weights of lens barrels vary depending on an angle of view, a focal length, etc. of the imaging lens. In general, a lens barrel provided with a lens having a long focal length is configured such that a tripod seat is attachable thereto, and the lens barrel is attached to a tripod via the tripod seat.

Japanese Patent Provisional Publication No. 2003-337275A (hereafter, referred to as a "patent document 1") discloses a lens barrel including a first tripod seat unit and a second tripod seat unit which is detachably attachable to the first tripod seat unit. In the lens barrel described in the patent document 1, the first tripod seat unit and the second tripod seat unit have respective tripod seat fitting parts via which the first tripod seat unit and the second tripod seat unit are detachably fitted to each other. The second tripod seat unit includes a slit and a fixing screw provided to change the width of the slit and thereby change the size of a gap of a fitted portion between the respective fitting parts of the first tripod seat unit and the second tripod seat unit. By changing the width of the slit by the fixing screw, the first tripod seat unit and the second tripod seat unit are fixed or a fixed state of the first tripod seat unit and the second tripod seat unit are released.

SUMMARY OF THE INVENTION

In the lens barrel described in the patent document 1, in order to reduce the width of the slit, the fixing screw is tightened and thereby the second tripod seat unit is elastically deformed. Therefore, in order to fix the first tripod seat unit and the second tripod seat unit with respect to each other, it is necessary to narrow the gap between the respective fitting parts of the first tripod seat unit and the second tripod seat unit, by screwing the fixing screw against a restoring force caused by the elastic deformation in a direction of releasing the fixed state, i.e., by screwing the fixing screw with a force greater than the restoring force. Therefore, a problem arises that the fixing of the first tripod seat unit and the second tripod seat unit is troublesome.

The present invention is made in consideration of the above circumstances. That is, the object of the invention is to provide a mechanism for attaching and detaching a tripod seat capable of attaching/detaching a first tripod seat unit to/from a second tripod seat unit with a quick operation.

A mechanism for attaching and detaching a tripod seat according to an embodiment of the invention comprises: a first tripod seat unit; and a second tripod seat unit to which the first tripod seta unit is detachably attached. In this configuration, one of the first tripod seat unit and the second tripod seat unit has a first fixing member and a second fixing member formed to be screwed together, the other of the first tripod seat unit and the second tripod seat unit has an attachment part brought to be in pressure contact with the second fixing member by screwing the first fixing member to the second fixing member, and by bringing the attachment part to be in pressure contact with the second fixing member, the first tripod seat unit is fixed to the second tripod seat unit. For example, the first fixing member is a fixing screw, and the second fixing member is a fixing key.

According to the above described configuration, it is possible to fix the first tripod seat unit to the second tripod seat unit and to release the fixed state by a simple operation of tightening or loosening the first fixing member (a fixing screw). Therefore, it is possible to quickly attach or detach the first tripod seat unit with respect to the second tripod seat unit.

By screwing the first fixing member to the second fixing member, the attachment part may be fixed in a state where the attachment part is sandwiched between the second fixing member and the one of the first tripod seat unit and the second tripod seat unit.

The attachment part may have a dovetail joint. In this case, the second fixing member and the one of the first tripod seat unit and the second tripod seat unit form a dovetail groove into which the dovetail joint is fitted.

The second fixing member may have an engagement projection, and the attachment part may have a groove part along which the engagement projection is movable, the groove part being formed with an engagement groove. In this case, the groove part is formed to guide the engagement projection in the groove part when the first tripod seat unit is attached to the second tripod seat unit. The engagement projection is guided to the engagement groove of the groove part, the engagement projection engages with the engagement groove and prevents the first tripod seat unit from falling off the second tripod seat unit.

The mechanism for attaching and detaching a tripod seat may further comprise a pressing part configured to press the second fixing member toward the attachment part.

A mechanism for attaching and detaching a tripod seat according to an embodiment of the invention comprises: a first tripod seat unit configured to be fixed to or detachably attachable to a lens barrel; and a second tripod seat unit to which the first tripod seat unit is detachably attached. In this configuration, one of the first tripod seat unit and the second tripod seat unit has a first fixing member and a second fixing member, the other of the first tripod seat unit and the second tripod seat unit has an attachment part, and by operating the first fixing member, the second fixing member is brought to be in pressure contact with the attachment part and thereby the first tripod seat unit is fixed to the second tripod seat unit.

A mechanism for attaching and detaching a tripod seat according to an embodiment of the invention comprises: a first tripod seat unit configured to be fixed to or detachably attachable to an image capturing apparatus; and a second tripod seat unit to which the first tripod seat unit is detachably attached. In this configuration, one of the first tripod seat unit and the second tripod seat unit has a first fixing member and a second fixing member, the other of the first tripod seat unit and the second tripod seat unit has an attachment part, and by operating the first fixing member, the second fixing member is brought to be in pressure contact with the attachment part and thereby the first tripod seat unit is fixed to the second tripod seat unit.

According to the configuration of the embodiment of the invention, it is possible to provide a mechanism for attaching and detaching a tripod seat capable of attaching and detaching the first tripod seat unit with respect to the second tripod seat unit by a simple operation of tightening or loosening the first fixing member.

A mechanism for attaching and detaching a tripod seat according to an embodiment of the invention comprises: a first tripod seat unit; a second tripod seat unit to which the first tripod seat unit is detachably attached; a first fixing member provided for one of the first tripod seat unit and the second tripod seat unit, the first fixing member being formed to fix the first tripod seat unit attached to the second tripod seat unit; and a falling-off preventing mechanism configured to prevent the first tripod seat unit from falling off the second tripod seat unit in a state where the first fixing member does not fix the first tripod seat unit to the second tripod seat unit. In this configuration, the falling-off preventing mechanism is configured to release a state of preventing occurrence of falling-off of the first tripod seat unit when the first fixing member is operated.

According to the above described embodiment, through an operation to the first fixing member, it is possible to fix the first tripod seat unit to the second tripod seat unit and release the fixed state and it is possible to release the state of preventing occurrence of falling-off if the first tripod seat unit. Therefore, it is possible to attach and detach the first tripod seat unit with respect to the second tripod seat unit through a quick operation while preventing the first tripod seat unit from falling off the second tripod seat unit.

The first fixing member may be a fixing screw having a thread part. In this case, the first tripod seat unit is fixed to the second tripod seat unit by tightening the fixing screw, and by letting the fixing screw move in a axis direction of the fixing screw, the state of preventing occurrence of falling-off of the first tripod seat unit is released and thereby the first tripod seat unit is brought to be detachable from the second tripod seat unit.

The one of the first tripod seat unit and the second tripod seat unit may have a second fixing member to which the fixing screw is screwed, and the other of the first tripod seat unit and the second tripod seat unit may have an attachment part brought to be in pressure contact with the second fixing member when the fixing screw is screwed into the second fixing member. In this case, by bringing the attachment part to be in pressure contact with the second fixing member, the first tripod seat unit is fixed to the second tripod seat unit.

The attachment part may have a dovetail joint. In this case, the second fixing member and the one of the first tripod seat unit and the second tripod seat unit faint a dovetail groove into which the dovetail joint is fitted.

The falling-off preventing mechanism may comprise: an engagement projection provided on the second fixing member; and a groove part formed on the attachment part to allow the engagement projection to be movable along the groove part, the groove part being formed with an engagement groove. In this case, the groove part is formed to guide the engagement projection in the groove part when the first tripod seat unit is attached to the second tripod seat unit, and when the engagement projection is guided to the engagement groove of the groove part, the engagement projection engages with the engagement groove and prevents the first tripod seat unit from falling off the second tripod seat unit.

A mechanism for attaching and detaching a tripod seat according to an embodiment of the invention comprises: a first tripod seat unit; a second tripod seat unit to which the first tripod seat unit is detachably attached; a fixing means configured to fix the first tripod seat unit attached to the second tripod seat unit; and a falling-off preventing mechanism configured to prevent the first tripod seat unit from falling off the second tripod seat unit in a state where the first tripod seat unit is attached to the second tripod seat unit and the fixing means does not fix the first tripod seat unit. In this configuration, the falling-off preventing mechanism prevents the first tripod seat unit from falling off the second tripod seat unit without a need for an operation to the fixing means when the first tripod seat unit is attached to the second tripod seat unit.

A mechanism for attaching and detaching a tripod seat according to an embodiment of the invention comprises: a first tripod seat unit; a second tripod seat unit to which the first tripod seat unit is detachably attached; a fixing member configured to fix the first tripod seat unit attached to the second tripod seat unit; and a falling-off preventing mechanism configured to prevent the first tripod seat unit from falling off the second tripod seat unit in a state where the fixing member does not fix the first tripod seat unit to the second tripod seat unit. In this configuration, by performing a first operation to the fixing member, fixation of the first tripod seat unit by the fixing member is released, and by performing a second operation different from the first operation to the fixing member, prevention of falling-off by the falling-off preventing mechanism is released.

The fixing member may be a fixing screw having a thread part. In this case, by tightening the fixing screw, the first tripod seat unit is fixed to the second tripod seat unit. The first operation is an operation of loosening the tightened fixing screw, and the second operation is an operation of moving the fixing screw in an axis direction of the fixing screw.

According to the above described embodiment, it is possible to provide a mechanism for attaching and detaching a tripod seat capable of attaching and detaching the first tripod seat unit with respect to the second tripod seat unit through a quick operation while preventing the first tripod seat unit from falling off the second tripod seat unit.

EMBODIMENTS FOR CARRYING OUT THE INVENTION

In the following, an embodiment according to the invention is described with reference to the accompanying drawings.

Figure 1A:
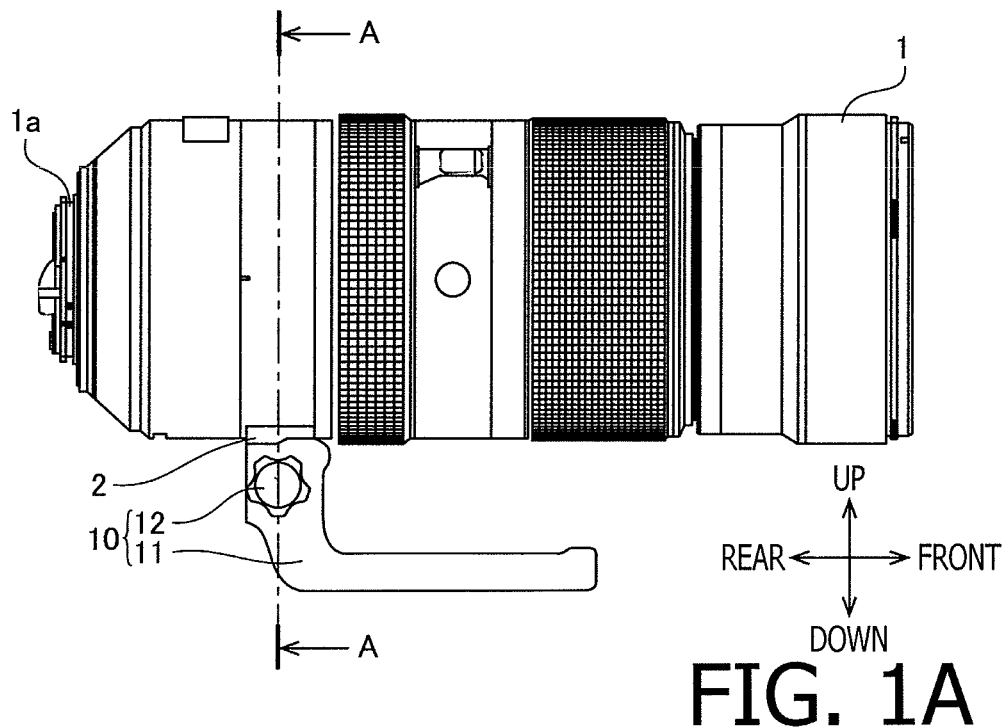
FIGS. 1A and 1B are side views of a lens barrel having a mechanism for attaching and detaching a tripod seat according to an embodiment of the invention.
Figure 1B:
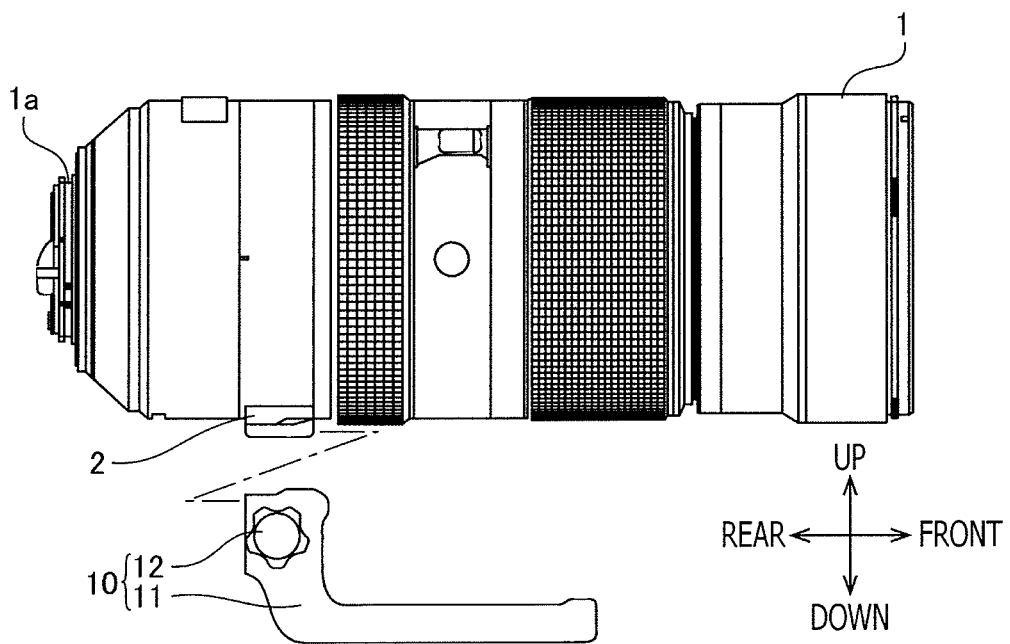
Figure 2:
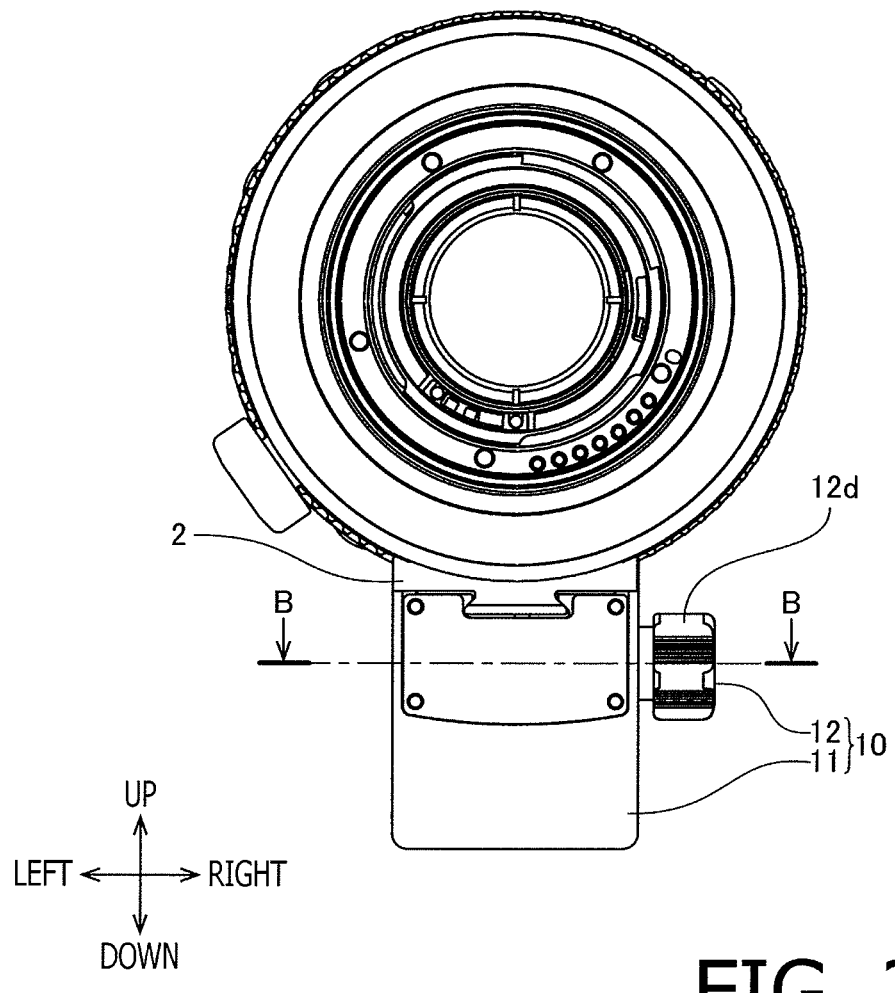
FIG. 2 is a rear view of the lens barrel having the mechanism for attaching and detaching a tripod seat according to the embodiment of the invention.

FIGS. 1A and 1B are side views of a lens barrel 1 having a mechanism for attaching and detaching a tripod seat according to the embodiment of the invention. The mechanism for attaching and detaching a tripod seat includes a first tripod seat unit 2 and a second tripod seat unit 10. Aluminum is used as material of the first tripod seat unit 1 and the second tripod seat unit 2; however, the embodiment is not limited to such an example. For example, as material of the first tripod seat unit 2 and the second tripod seat unit 10, light metal such as aluminum alloy or magnesium alloy may be used. The first tripod seat unit 2 is detachably attached to the second tripod seat unit 10. FIG. 1A shows a state where the first tripod seat unit 2 is fixed to the second tripod seat unit 10. FIG. 1B shows a state where the first tripod seat unit 2 is detached from the second tripod seat unit 10. FIG. 2 is a rear view of the lens barrel 1 having the mechanism for attaching and detaching a tripod seat according to the embodiment.

The lens barrel 1 has a cylindrical shape, and has a plurality of lenses therein. At one end of the lens barrel 1 in an optical axis direction, the lens barrel 1 has a connection part 1a. The connection part 1a is detachably attached to a main body of an image capturing apparatus (not shown). Object light from a subject enters the lens barrel 1 from the other end of the lens barrel 1, and emerges from the one end of the lens barrel 1 while passing through the plurality of lenses. The object light emerging from the lens barrel 1 is captured by the image capturing apparatus and is converted into an image signal.

In the following explanation, an optical axis direction of the lens barrel 1 in FIG. 1 is defined as a front and rear direction, and a side on which the connection part 1a of the lens barrel 1 is provided in the front and rear direction is defined as a rear side. Furthermore, a side on which the first tripod seat unit 2 of the lens barrel 1 is provided in FIG. 1 is defined as a lower side, and a side opposite to the lower side is defined as an upper side. Furthermore, a direction perpendicular to both of the front and rear direction and the up and down direction is defined as a left and right direction, and a side on which a grip part 12d of a fixing screw 12 (which is described later) is provided in the left and right direction is defined as a right side.

Figure 3A:
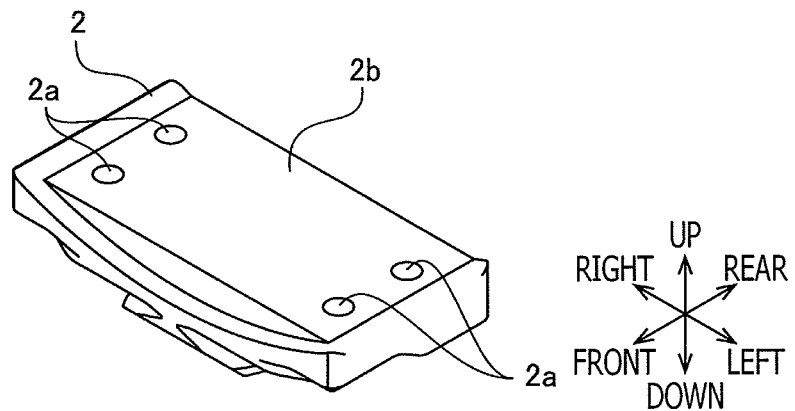
FIGS. 3A and 3B are perspective views of a first tripod seat unit according to the embodiment of the invention.
Figure 3B:
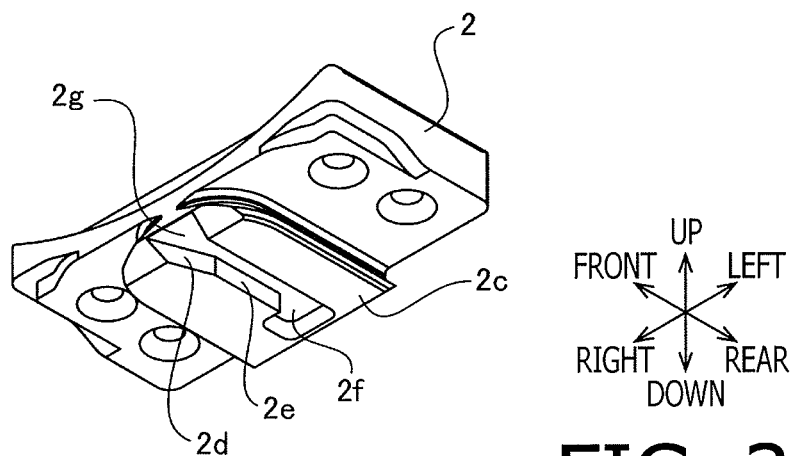

FIGS. 3A and 3B are perspective views of the first tripod seat unit 2 according to the embodiment of the invention. The first tripod seat unit 2 has a plurality of holes 2a for screwing the first tripod seat unit 2 to the lens barrel 1. The first tripod seat unit 2 is fixed to the lens barrel 1 by screwing in a state where an attaching surface 2b contacts a part of an outer circumference of the lens barrel 1. On an opposite side of the attaching surface 2b (i.e., on a lower side) of the first tripod seat unit 2, an attachment part 2c to which the second tripod seat unit 10 is attached is formed. The attachment part 2c has a shape of a dovetail joint (i.e., a dovetail tenon) extending in the front and rear direction. On a lower surface of the attachment part 2c, a groove 2g is formed. In the groove 2g, an engagement projection 15 (described later) of the second tripod seat unit 10 is movable in the front and rear direction. On a right surface in the groove 2g, an inclined guide surface 2d and a guide surface 2e for guiding the engagement projection 15 are formed. Furthermore, in the groove 2g, an engagement groove 2f is formed by recessing the guide surface 2e rightward.

Figure 4:
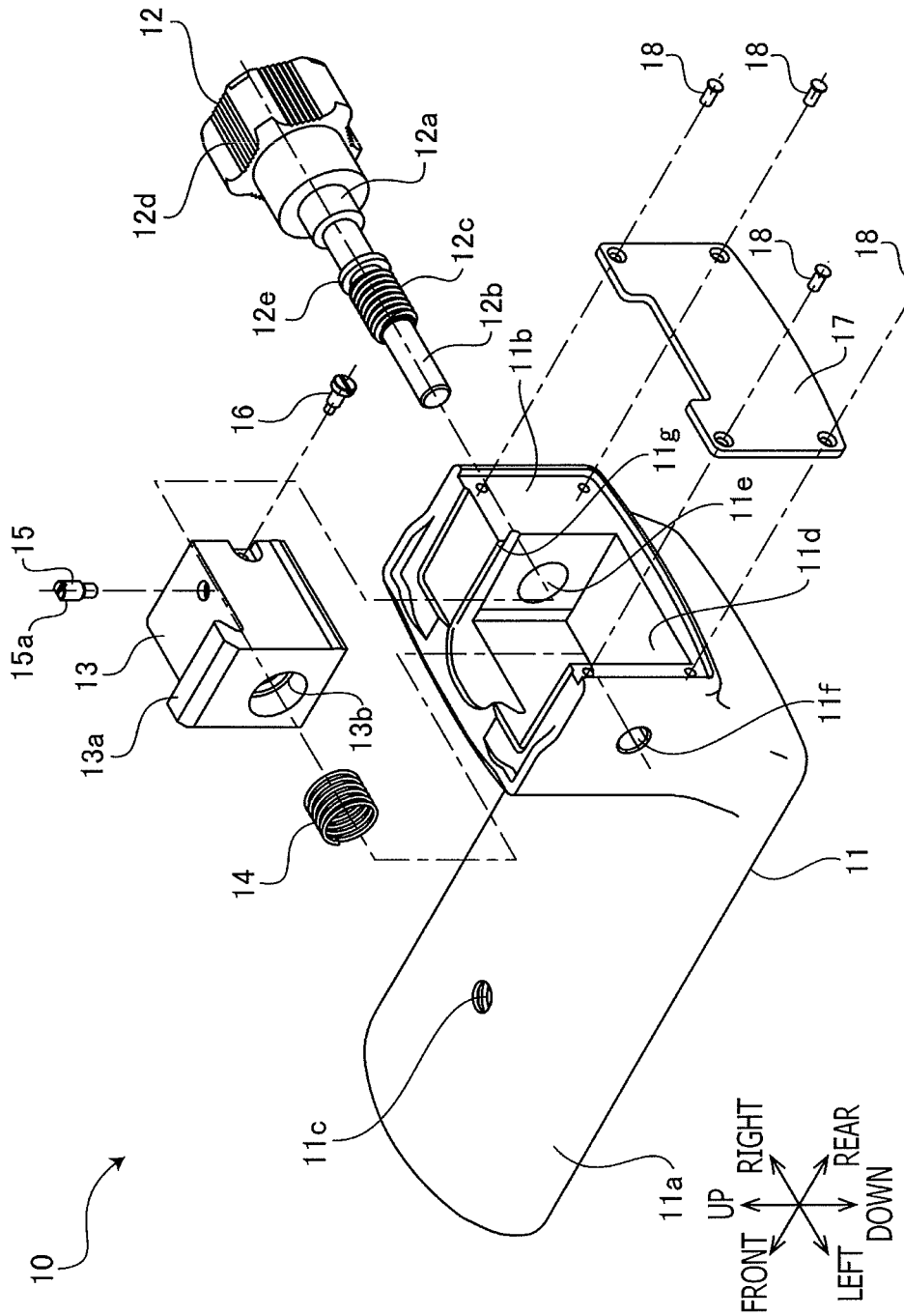
FIG. 4 is an exploded perspective view of a second tripod seat unit according to the embodiment of the invention.

FIG. 4 is an exploded perspective view of the second tripod seat unit 10 according to the embodiment of the invention. The second tripod seat unit 10 has a seat 11 having a shape of a letter L when viewed along the left and right direction. The seat 11 has a tripod connection part 11a which is fixed to a tripod (not shown) by screwing, and a unit connection part 11b configured to fix the first tripod seat unit 2. In the tripod connection part 11a, two screw holes 11c are formed (one screwing hole is not shown in FIG. 4). The screwing holes 11c are used to connect the second tripod seat unit 10 to a tripod with screws (not shown). The unit connection part 11b has a lightened part 11d. In the left and right surfaces of the lightened part 11d, through holes 11e and 11f are coaxially formed.

In the lightened part 11d of the unit connection part 11b, a fixing key 13 and a compression spring 14 are housed. In the fixing key 13, a through hole is formed to penetrate through the fixing key 13 in the left and right direction, and an internal thread 13b is formed in the through hole.

Into the fixed key 13, a fixing screw 12 is screwed in a state where the fixing key 13 is housed in the lightened part 11d. The fixing screw 12 has an external thread part 12c between cylindrical parts 12a and 12b. A screwing axis direction of the external thread part 12c is in parallel with the left and right direction. Between the cylindrical part 12a and the external thread part 12c of the fixing screw 12, a restricting wall 12e having a shape of a circular plate is formed. The fixing screw 12 has a grip part 12d. A user operates the grip part 12d to rotate the fixing screw 12. The fixing screw 12 is inserted into the through hole 11e from the right side, and the external thread 12c of the fixing screw 12 is screwed to the internal thread 13b of the fixing key 13. The cylindrical parts 12a and 12b are pivotally supported by the through holes 11e and 11f, respectively.

After the fixing screw 12 is screwed to the fixing key 13, a set pin 16 is inserted into the fixing key 13. A tip of the set pin 16 inserted into the fixing key 13 reaches to a position inside the through hole of the fixing key 13 where the internal thread 13b is formed. When the fixing key 13 is loosened (when the fixing screw 12 is rotated to release engagement with the fixing key 13), the set pin 16 contacts the restricting wall 12e from the right side in the through hole of the fixing key 13, and thereby restricts a moving amount of the fixing screw 12 with respect to the fixing key 13. Furthermore, by letting the set pin 16 contact the restricting wall 12e, it becomes possible to prevent an engaged state of the fixing screw 12 and the fixing key 13 from being released, and thereby it becomes possible to prevent the fixing screw 12 from dropping off the seat 11.

A cover 17 is fixed to the seat 11 with four screws 18 from the rear side to cover the lightened part 11d of the seat 11 from the rear side.

On an upper portion of the unit connection part 11b and an upper portion of the fixing key 13, a level difference 11g and a level difference 13a are formed, respectively, to extend in the front and rear direction. In a state where the fixing key 13 is housed in the lightened part 11d, a dovetail groove (a dovetail hole) 20 is formed by the level differences 11g and 13a (see FIG. 6). In an area (the dovetail groove 20) sandwiched between the level differences 11g and 13a on the upper portion of the fixing key 13, an engagement projection 15 is provided. The engagement projection 15 has a semi cylindrical shape formed such that a front side surface 15*a* is formed to be a flat surface.

By letting the dovetail groove 20 formed on the second tripod seat unit 10 and the attachment part 2*c* having a shape of a dovetail joint of the first tripod seat unit 2 engage with each other (i.e., dovetail together), the first tripod seat unit 2 is attached to the second tripod seat unit 10.

Each of FIGS. 5A to 5E is a cross section of the second tripod seat unit 10 cut along a line B-B in FIG. 2. For convenience of explanation, in each of FIGS. 5A to 5E, the first tripod seat unit 2 and the engagement projection 15 are indicated by dashed lines.

Figure 5A:
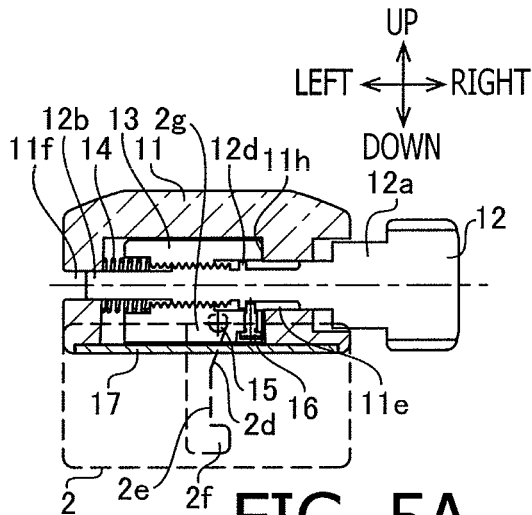
FIGS. 5A to 5E are cross sections of the second tripod seat unit according to the embodiment of the invention.

FIG. 5A illustrates a state where attaching work to attach the first tripod seat unit 2 to the second tripod seat unit 10 is started. In this state, since the fixing screw 12 is loosened, the restricting wall 12*e* contacts the set pin 16. In order to attach the first tripod seat unit 2 to the second tripod seat unit 10, the dovetail groove 20 is engaged with the attachment part 2*c* having a shape of a dovetail joint from the front side of the first tripod seat unit 2. In this case, since the fixing key 13 is pressed toward the right side by the compression spring 14, the fixing key 13 is in contact with a right wall 11*h* of the lightened part 11*d*. When the first tripod seta unit 2 is attached to the second tripod seat unit 10, the engagement projection 15 is disposed in the groove 2*g* and contacts the inclined guide surface 2*d*.

Figure 5B:
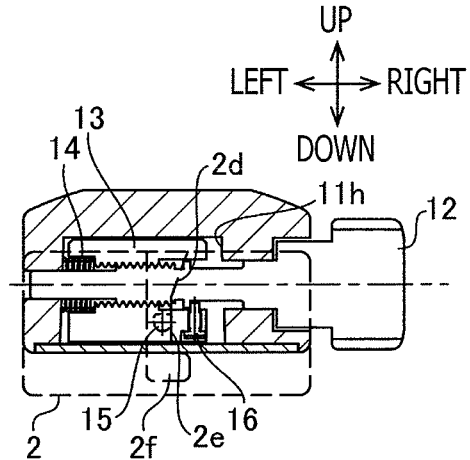

When the first tripod seat unit 2 is moved frontward from the state shown in FIG. 5A, the second tripod seat unit 10 is brought to a state shown in FIG. 5B. Since the engagement projection 15 moves from the inclined guide surface 2*d* to the guide surface 2*e* while sliding on the inclined guide surface 2*d* and the guide surface 2*e* in accordance with movement of the first tripod seat unit 2, the fixing key 13 is separated from the right wall 11*h* against the pressing force of the compression spring 14 and thereby moves to the left side.

Figure 6:
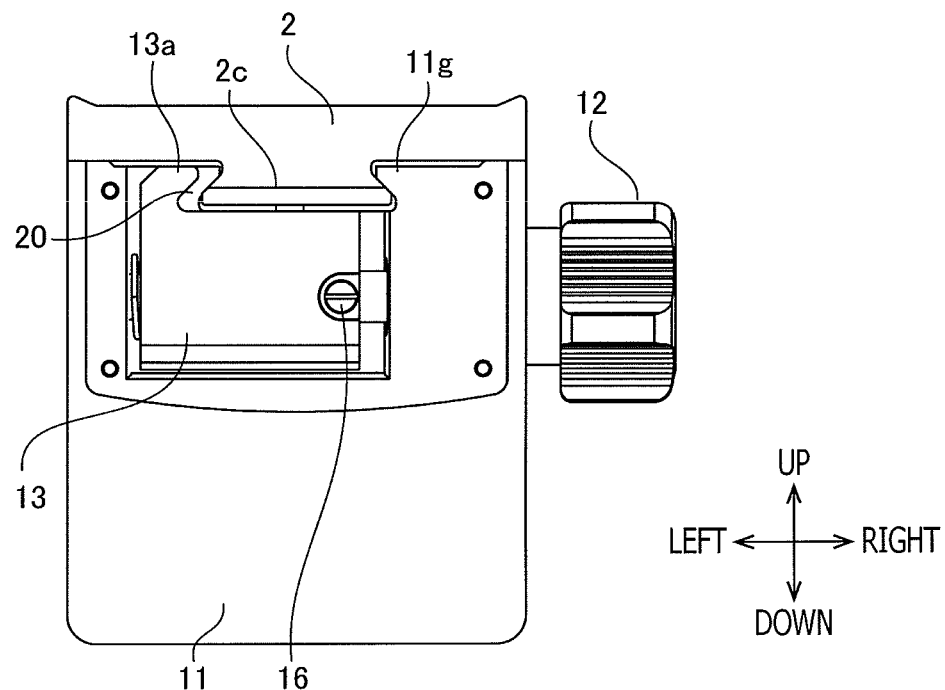
FIG. 6 is a rear view of the first tripod seat unit and the second tripod seat unit according to the embodiment of the invention.

FIG. 6 is a rear view of the first tripod seat unit 2 and the second tripod seat unit 10 in this state. For convenience of explanation, in FIG. 6, the cover 17 is omitted. As shown in FIG. 6, on the second tripod seat unit 10, the dovetail groove (dovetail hole) 20 is formed by the level differences 11*g* and 13*a*. In accordance with movement of the engagement projection 15 from the inclined guide surface 2*d* to the guide surface 2*e* while contacting with the inclined guide surface 2*d* and the guide surface 2*e*, the fixing key 13 moves leftward and thereby the width of the dovetail groove 20 in the left and right direction is increased. Consequently, it becomes possible to easily attach the attachment part 2*c* to the second tripod seat unit 10.

Figure 5C:
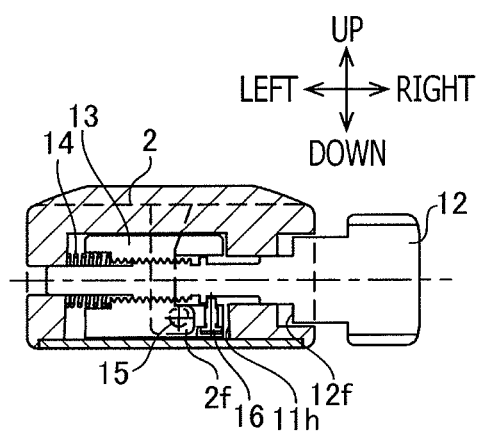

When the first tripod seat unit 2 is further moved frontward from the state shown in FIG. 5B, the second tripod seat unit 10 is brought to a state shown in FIG. 5C. In the state shown in FIG. 5C, the compression spring 14 presses the fixing key 13 to the right side, and thereby the engagement projection 15 enters an engagement groove 2*f*. At this time, the fixing key 13 is at a position closer to the wall 11*h* relative to the state shown in FIG. 5B.

Figure 7:
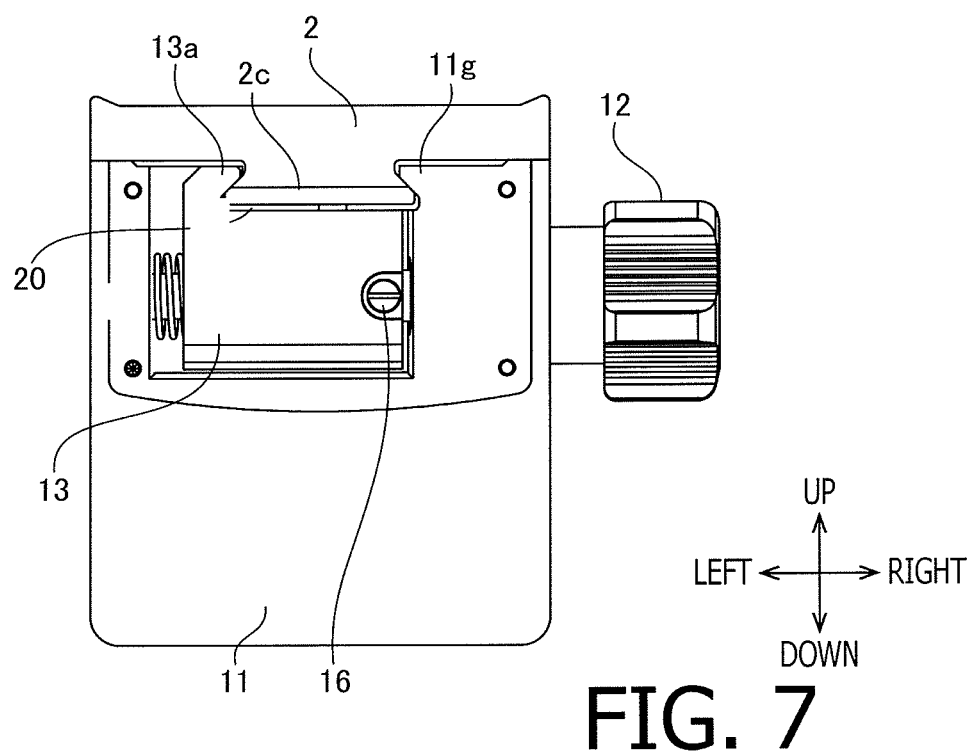
FIG. 7 is a rear view of the first tripod seat unit and the second tripod seat unit according to the embodiment of the invention.

FIG. 7 is a rear view of the first tripod seat unit 2 and the second tripod seat unit 10 in this state. For convenience of explanation, in FIG. 7, the cover 17 is omitted. As shown in FIG. 7, in the state where the engagement projection 15 enters the engagement groove 2*f*, the attachment part 2*c* is sandwiched by the level differences 11*g* and 13*a* since the fixing key 13 is pressed by the compression spring 14. At this time, the attachment part 2*c* is sandwiched only by the pressing force of the compression spring 14, and the first tripod seat unit 2 is not fixed with respect to the second tripod seat unit 10.

However, in the state shown in FIG. 5C, the engagement projection 15 enters the engagement groove 2*f* and movement of the engagement projection 15 in the front and rear direction is restricted by the front and rear surfaces of the engagement groove 2*f*. Therefore, even when the first tripod seat unit 2 is moved in the front and rear direction, the engagement projection 15 contacts the front and rear surfaces of the engagement rove 2*f* and thereby movement of the first tripod seat unit 2 is restricted. As a result, the engagement projection 15 and the engagement groove 2*f* serve as a falling-off preventing mechanism for the first tripod seat unit 2. That is, it becomes possible to prevent the first tripod seat unit 2 from unintentionally falling off the second tripod seat unit 10.

Since, in the state shown in FIG. 5C, the first tripod seat unit 2 is not fixed with respect to the second tripod seat unit 10, a possibility arises that the fixing key 13 moves to the left side by an external force not intended by a user. For example, when an external force causing the second tripod seat unit 10 to vibrate in the left and right direction is applied to the second tripod seat unit 10 or when an external force causing the second tripod seat unit 10 to rotate about an axis parallel with the up and down direction is applied to the second tripod seat unit 10, the fixing key 13 may be pushed to the left side by the attachment part 2*c* of the first tripod seat unit 2, and thereby the engagement between the engagement projection 15 and the engagement groove 2*f* may be released momentarily. When a force causing the first tripod seat unit 2 to move rearward acts in the state where the engagement between the engagement projection 15 and the engagement groove 2*f* is released, the first tripod seat unit 2 falls off the second tripod seat unit 10. For this reason, according to the embodiment, the cover 17 is provided to prevent occurrence of momentary disengagement between the engagement projection 15 and the engagement groove 2*f* by an unintentional external force.

Figure 8A:
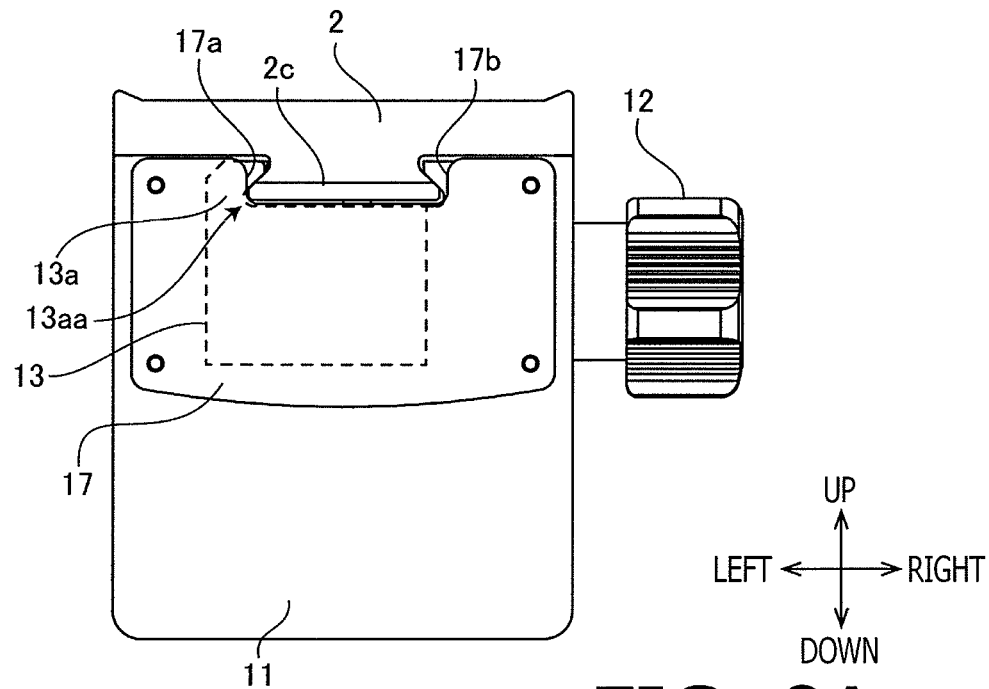
FIGS. 8A and 8B respectively show a rear view of the first tripod seat unit and the second tripod seat unit, and a bottom view of the first tripod seat unit according to the embodiment of the invention.
Figure 8B:
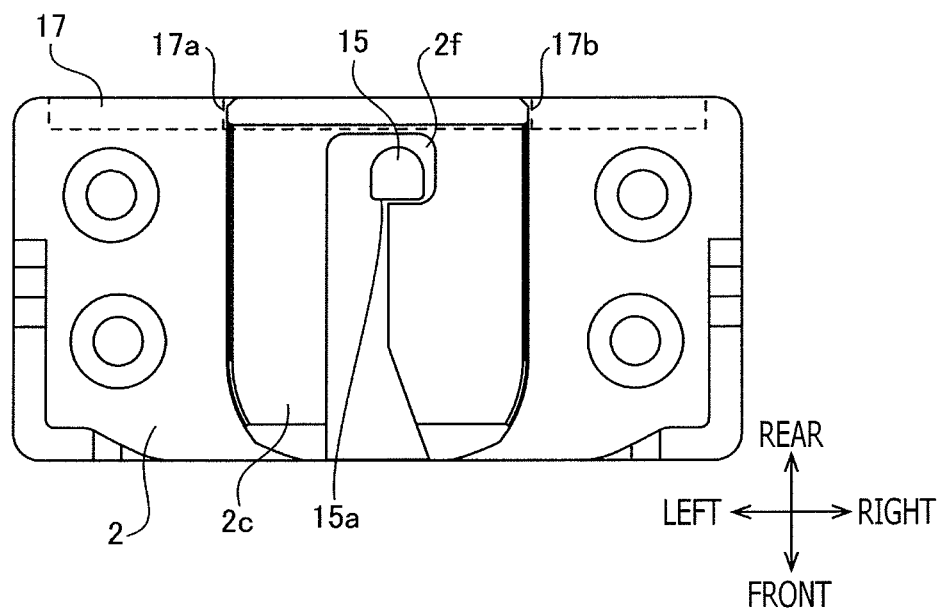

FIGS. 8A and 8B respectively show a rear view of the first tripod seat unit 2 and the second tripod seat unit 10 and a bottom view of the first tripod seat unit 2 in a state where the second tripod seat unit 10 is in the state shown in FIG. 5C. For convenience of explanation, in FIG. 8A, the fixing key 13 is indicated by a dashed line. For convenience of explanation, in FIG. 8B, the cover 17 is indicated by a dashed line.

As shown in FIG. 8A, a side surface 17*a* of the cover 17 partially overlaps with the level difference 13*a* when viewed along the front and rear direction. Furthermore, as shown in FIG. 8B, the rear edge of the attachment part 2*c* is disposed at the same position as that of the side surface 17*a* of the cover 17. Therefore, when an external force applies on the seat 11 to the right direction in the state shown in FIGS. 8A and 8B (FIG. 5C), the attachment part 2*c* relatively moves to the left side and thereby the left edge of the attachment part 2*c* contacts the side surface 17*a* of the cover 17. Since the cover 17 is fixed to the seat 11 with the screws 18, the attachment part 2*c* is prevented from further moving to the left side from the state where the attachment part 2*c* is in contact with the side surface 17*a*. As a result, the fixing key 13 is prevented from moving to the left side by being pushed by the attachment part 2*c*, and thereby it becomes possible to prevent engagement of the engagement projection 15 and the engagement groove 2*f* from being released by the external force applied to the seat 11.

Figure 5D:
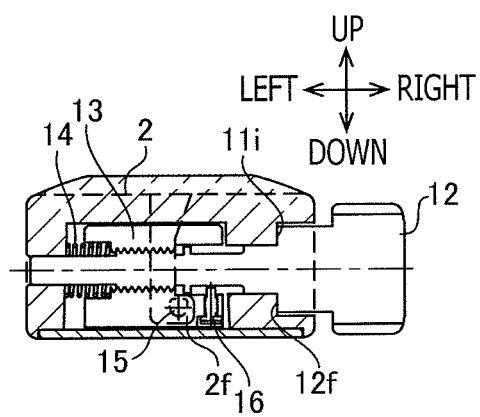
Figure 5E:
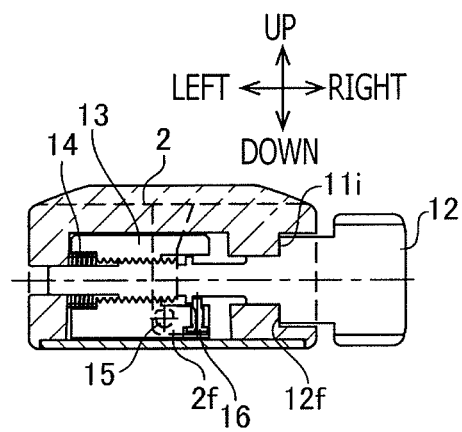

When the fixing screw 12 is tightened from the state shown in FIG. 5C, the second tripod seat unit 10 is brought to the state shown in FIG. 5D. When the fixing screw 12 is tightened, the fixing key 13 does not move because the level difference 13a is in contact with the attachment part 2c, and the fixing screw 12 is drawn into the fixing key 13. The fixing screw 12 stops at a position at which a contact surface 12f contacts the right wall 11i of the seat 11.

Figure 9:
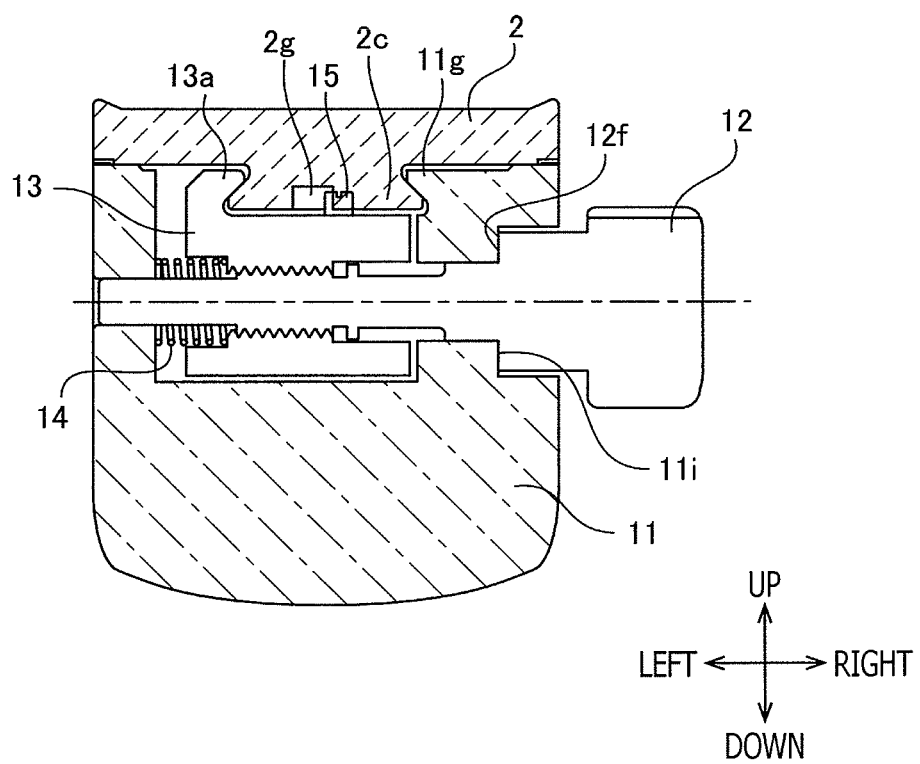
FIG. 9 is a cross section of the first tripod seat unit and the second tripod seat unit according to the embodiment of the invention.

FIG. 9 illustrates a cross section of the first tripod seat unit 2 and the second tripod seat unit 10 in this state. FIG. 9 is a cross sectional view of the first tripod seat unit 2 and the second tripod seat unit 10 cut along a line A-A in FIG. 1A. When the fixing screw 12 is further tightened from the state shown in FIG. 9, the fixing key 13 is drawn to the wall 11h side (the right side) because movement of the fixing screw 12 to the left side is restricted by the wall 11i. As a result, the level difference 13a of the fixing key 13 is pressed against the attachment part 2c in accordance with the tightening of the fixing screw 12. Therefore, the attachment part 2c is firmly sandwiched by the level differences 11g and 13a, and thereby the first tripod seat unit 2 is firmly held by the second tripod seat unit 10. In the state where the first tripod seat unit 2 is firmly held by the second tripod seat unit 10, even if a force applies to the first tripod seat unit 2 in the front and rear direction, movement of the first tripod seat unit 2 is restricted by a frictional force acting between the attachment part 2c and the level differences 11g and 13a.

The first tripod seat unit 2 is securely brought to the state of being fixed to the second tripod seat unit 10 via the state shown in FIG. 5D by only tightening the fixing screw 12 by approximately two turns from the state shown in FIG. 5C. Therefore, it is possible to fix the first tripod seat unit 2 to the second tripod seat unit 10 by a simple operation without the need for a great amount of force. Furthermore, since the operation is simple, it is possible to quickly fix the first tripod seat unit 2 to the second tripod seat unit 10.

Next, an operation for detaching the first tripod seat unit 2 from the second tripod seat unit 10 is explained. In order to detach the first tripod seat unit 2, first the fixing screw 12 is loosened until the restricting wall 12e of the fixing screw 12 contacts the set pin 16 from the state shown in FIG. 5D. As a result, the second tripod seat unit 10 is brought from the state shown in FIG. 5D to the state shown in FIG. 5C. At this time, the contact surface 12f of the fixing screw 12 is brought to the state of being separated from the wall 11i.

When the fixing screw 12 is pushed to the left side against the pressing force of the compression spring 13 in the state shown in FIG. 5C, the contact surface 12f contacts the wall 11i of the seat 11 and thereby the fixing screw 12 stops. At this time, the second tripod seat unit 10 is brought to the state shown in FIG. 5E. Since, in the state shown in FIG. 5E, the engagement between the engagement projection 15 and the engagement groove 2f is released, rearward movement of the first tripod seat unit 2 is not restricted. Therefore, by moving rearward the first tripod seat unit 10 while pushing the fixing screw 12, the first tripod seat unit 2 can be detached from the second tripod seat unit 10.

The lens barrel described in the patent document 1 includes a falling-off prevention member configured to prevent a second tripod seat unit from unintentionally falling off a first tripod seat unit. Specifically, the first tripod seat unit has a hole, and the second tripod seat unit is provided with a locking plate to be inserted into the hole. In a state where the first tripod seat unit engages with the second tripod seat unit, the locking plate is inserted into the hole. With this configuration, it becomes possible to prevent the second tripod seat unit from falling off the first tripod seat unit because, even when a fixed state of a tripod fitting part by a fixing screw is released, the locking plate contacts the hole.

Thus, in the lens barrel described in the patent document 1, even when the fixed state of the tripod fitting part by the fixing screw is released, it is possible to prevent occurrence of falling off of the first tripod seat unit. However, in the lens barrel described in the patent document 1, it is necessary to pull out the locking plate from the hole after releasing the fixed state of the fitting part by loosening the fixing screw, in order to detach the first tripod seat unit from the second tripod seat unit. That is, a user is required to additionally operate a member which is different from the fixing screw. Thus, a problem that an operation for detaching the first tripod seat unit from the second tripod seat unit is complicated is pointed out.

By contrast, in the mechanism for attaching and detaching a tripod seat according to the embodiment, the attachment part 2c is engaged with the dovetail groove 20, and the engagement projection 15 enters the engagement groove 2f when the first tripod seat unit 2 is attached to the second tripod seat unit 10. As a result, falling off of the first tripod seat unit 2 is prevented. In order to let the engagement projection 15 and the engagement groove 2f function as a falling-off preventing mechanism for the first tripod seat unit 2, it is only required to move the first tripod seat unit 2 in the state where the attachment part 2c engages with the dovetail groove 20. That is, it is not necessary to operate the fixing screw 12. Therefore, a burden on the user conducting a user operation for preventing falling off of the first tripod seat unit 2 is small, which is convenient for the user.

Furthermore, in the mechanism for attaching and detaching a tripod seat according to the embodiment, fixing and releasing of the first tripod seat unit 2 with respect to the second tripod seat unit 10 can be made by tightening or loosening the fixing screw 12. Furthermore, by moving the fixing screw 12 in the screw axis direction in the state where the second tripod seat unit 10 is released by loosening the fixing screw 12, it is possible to release the engagement between the engagement projection 15 and the engagement groove 2f being the falling-off preventing mechanism. Since both of releasing the fixed state and releasing the falling prevention can be made by operating the fixing screw 12, it is possible to quickly attach or detach the first tripod seat unit 2 with respect to the second tripod seat unit 10 while preventing occurrence of falling off of the first tripod seat unit 2. Furthermore, since the fixing and releasing of the fixed state of the first tripod seat unit 2 cam be made only by tightening and loosening of the fixing screw 12, an operation burden on the user is small, which is convenient for the user.

The foregoing is the explanation about the embodiment of the invention. Embodiments of the invention are not limited to the above described embodiment, but can be varied in various ways within the scope of the invention. For example, embodiments of the invention include a combination of embodiments explicitly described in this specification and embodiments easily realized from the above described embodiment.

In the configuration shown in FIG. 8A, the side surface 17a of the cover 17 is disposed on the right side with respect to a part 13aa of the level difference 13a; however, the embodiment is not limited to such an example. It is sufficient that the side surface 17a is disposed at a position where the side surface 17a is able to prevent occurrence of release of the engaged state of the engagement projection 15 and the engagement groove 2f. Therefore, the side surface 17a may be disposed on the left side with respect to the part 13aa of the level difference 13a.

Figure 10A:
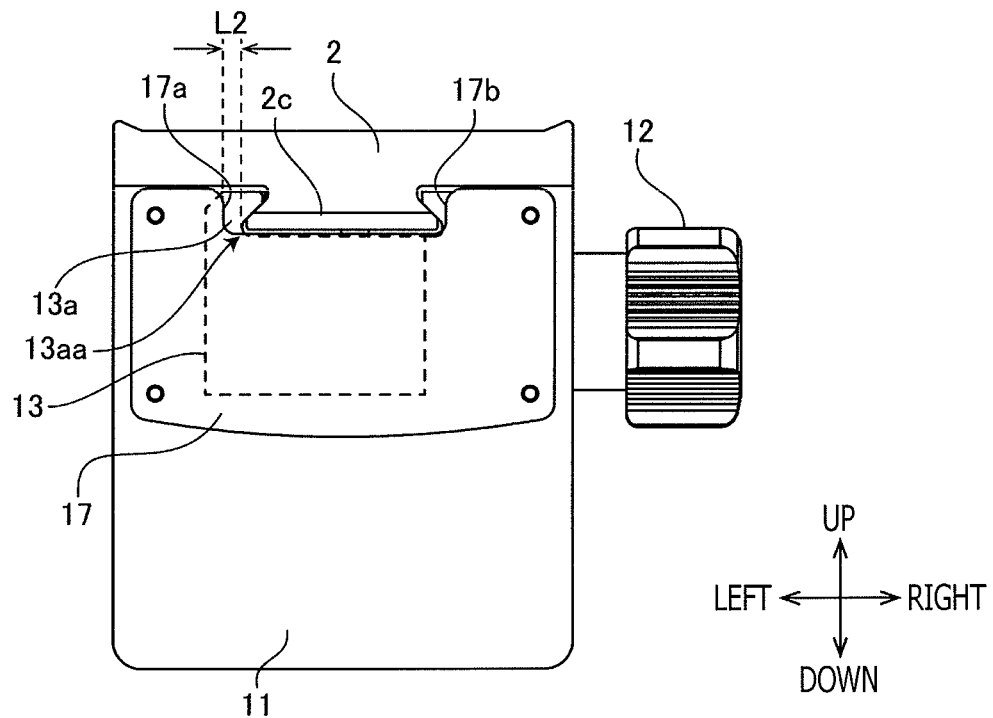
FIGS. 10A and 10B respectively show a rear view of the first tripod seat unit and the second tripod seat unit and a bottom view of the first tripod seat unit 2, according to a first variation of the embodiment of the invention.
Figure 10B:
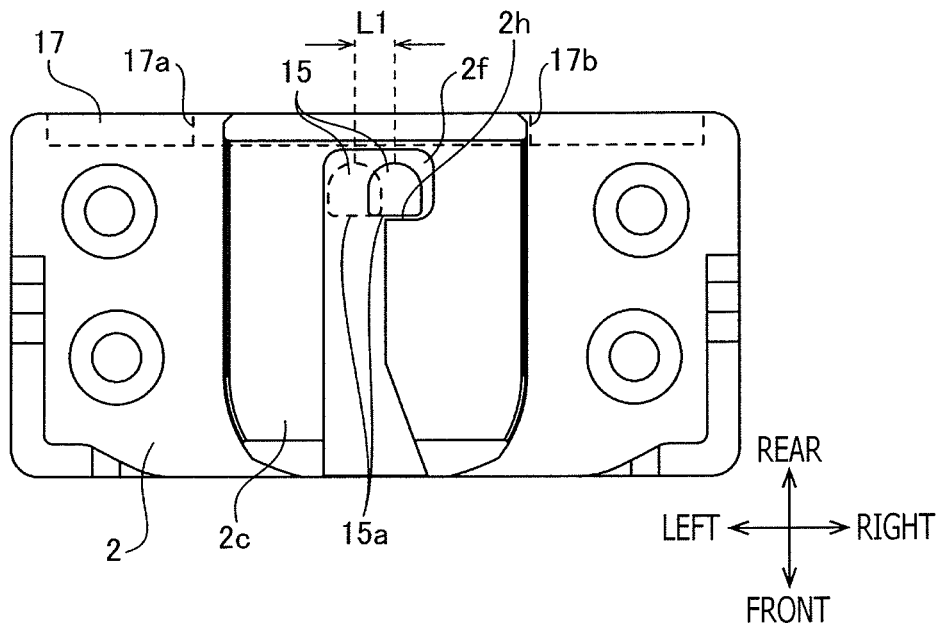

FIG. 10A is a rear view of the first tripod seat unit 2 and the second tripod seat unit 10 according to a first variation of the embodiment. FIG. 10B is a bottom view of the first tripod seat unit 2 according to the first variation. In FIG. 10A, for convenience of explanation, the fixing key 13 is indicated by a dashed line. In FIG. 10B, for convenience of explanation, the cover 17 is indicated by a dashed line. Furthermore, in FIG. 10B, the engagement projection 15 in the state of being engaged with the engagement groove 2f (in the state shown in FIG. 5C) is indicated by a solid line. In FIG. 10B, the engagement projection 15 in the state where the engagement between the engagement projection 15 and the engagement groove 2f is released (the state shown in FIG. 5E) is indicated by a dashed line.

When the first tripod seat unit 2 is moved rearward in the state where the engagement projection 15 engages with the engagement grove 2f, a planar surface part 15a of the engagement projection 15 contacts a surface 2h on a front side of the engagement groove 2f. As a result, it is possible to prevent occurrence of release of the engagement state between the engagement projection 15 and the engagement groove 2f. Furthermore, as shown by a dashed line in FIG. 10B, when the fixing screw 12 is pushed leftward, the engagement projection 15 moves leftward by a distance L1 with respect to the first tripod seat unit 2, and thereby the engagement between the engagement projection 15 and the engagement groove 2f is released. In this state, when the first tripod seat unit 2 is moved rearward, the first tripod seat unit 2 can be detached from the second tripod seat unit 10 since the planar surface part 15a of the engagement projection 15 does not contact the surface 2h on the front side of the engagement groove 2f.

Accordingly, in order to prevent the engaged state between the engagement projection 15 and the engagement groove 2f from being released when an unintended external force is applied to the seat 11, it is sufficient that the engagement projection 15 is provided not to be moved by such an external force to a position indicated by the dashed line in FIG. 10B. In the first variation shown in FIG. 10A, the side surface 17a is disposed to be separated on the left side by a distance L2 with respect to the part 13aa of the level difference 13a. The distance L2 is set to be smaller than the moving amount L1 required to change from the state where the engagement projection 15 engages with the engagement groove 2f to the state where the engagement between the engagement projection 15 and the engagement groove 2f is released. Therefore, even when the level difference 13a of the fixing key 13 is pushed to the left side by the attachment part 2c due to a rightward external force acting on the seat 11, the moving amount of the engagement projection 15 to the left side is suppressed to be smaller than or equal to the distance L2. As a result, it becomes possible to prevent occurrence of release of the engaged state between the engagement projection 15 and the engagement groove 2f by an external force. Furthermore, in the first variation, the interval between the side surface 17a and the side surface 17b of the cover 17 is larger than that shown in FIG. 8A. Such a configuration makes it possible to more easily attach the first tripod seat unit 2 to the second tripod seat unit 10.

Figure 11:
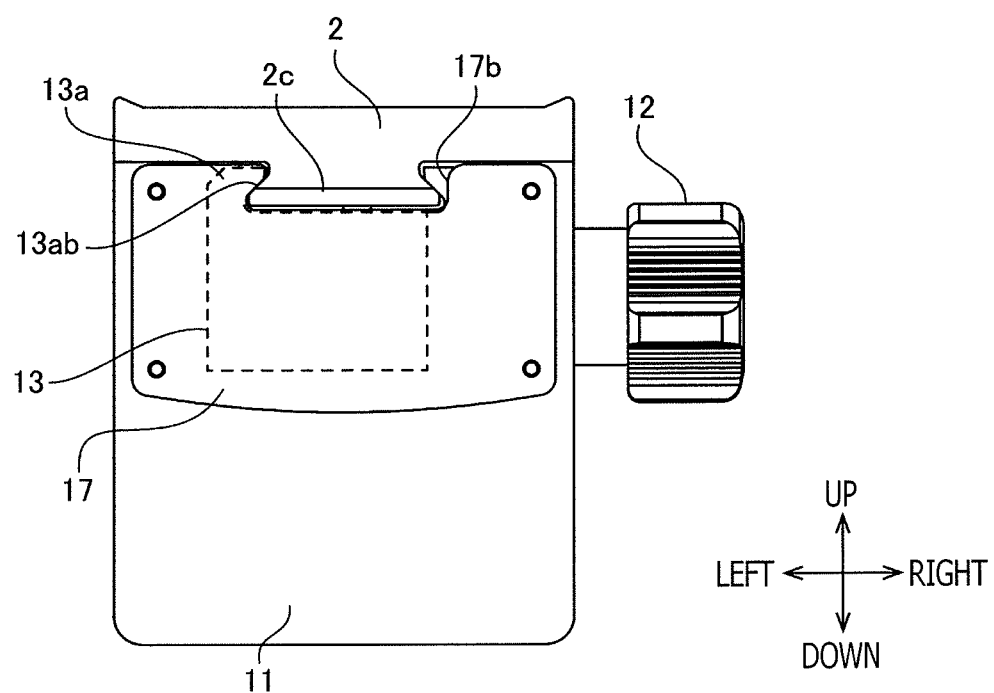
FIG. 11 is a rear view of the first tripod seat unit and the second tripod seat unit according to a second variation of the embodiment of the invention.

The shape of the cover 17 according to the embodiment is not limited to the examples shown in FIGS. 8A and 10A. FIG. 11 is a rear view of the first tripod seat unit 2 and the second tripod seat unit 10 according to a second variation of the embodiment. As shown in FIG. 11, in the second variation, the side surface 17a of the cover 17 is formed to be along the shape of a rightward inclined surface 13ab of the level difference 13a when viewed along the front and rear direction. According to such a configuration, the attachment part 2c contacts the side surface 17a in the case where an external force applies to the seat 11 to the right direction being an unintended direction as well as the case where an external force applies to the seat 11 to the lower direction and to the lower right direction. As a result, it becomes possible to more securely prevent the level difference 13a from being moved to the left side while being pushed by the attachment part 2c.

The shape of the engagement projection 15 according to the embodiment is not limited to a semi cylindrical shape. For example, the engagement projection 15 may have a shape of a circular column or a square column. However, it is noted that the engagement projection 15 prevents the first tripod seat unit 2 from falling off the second tripod seat unit 10 by contacting the surface 2h on the front side of the engagement groove 2f in the state where the engagement projection 15 engages with the engagement groove 2f. Therefore, it is preferable that a part of the engagement projection 15 contacting the surface 2h (a front part of the engagement projection) is formed in a planar shape.

The first tripod seat unit 2 shown in FIG. 3 has the attaching surface 2b and is configured to be screwed to the lens barrel 1; however, the embodiment is not limited to such a configuration. For example, the first tripod seat unit 2 may have a ring-shaped tightening member. In such a case, the first tripod seat unit 2 is detachably attached to the lens barrel 1 by letting the ring-shaped tightening member be fitted to the lens barrel 1, and is thus fixed. The first tripod seat unit 2 may be detachably attached and fixed to a housing of an image capturing apparatus in place of the lens barrel 1.

Although in FIGS. 5A to 5E only the first tripod seat unit 2 and the second tripod seat unit 10 are illustrated; however, it is possible to fix the first tripod seat unit 2 to the second tripod seat unit 10 in the state where the first tripod seat unit 2 is fixed to the lens barrel 1 and the second tripod seta unit 10 is fixed to a tripod.

In FIG. 1, the first tripod seat unit 2 is detachably attached and fixed to the lens barrel 1; however, the embodiment is not limited to such an example. For example, the first tripod seat unit 2 may be detachably attached and fixed to a tripod. In such a case, the second tripod seat unit 10 is detachably attached and fixed to the lens barrel 1 or a housing of an image capturing apparatus.

In the above described embodiment, the attachment part 2c is firmly sandwiched between the level differences 11g and 13a by screwing the fixing screw 12 to the fixing key 13, and thereby the first tripod seat unit 2 is fixed to the second tripod seat unit 10; however, the embodiment is not limited to such a configuration. For example, the first tripod seat unit 2 may be fixed to the second tripod seat unit 10 by causing the fixing screw 12 to be pulled to the right side in the state of the second tripod seat unit 10 is in the state shown in FIG. 5C. When the fixing screw 12 is pulled to the right side, the level differences 11g and the 13a are pressed to contact the attachment part 2c and firmly sandwich the attachment part 2c. As a result, the first tripod seat unit 2 is fixed to the second tripod seat unit 10. In this case, the fixing screw 12 is fixed in a state of being pulled by a fixing mechanism (not shown) such that the state of being pulled to the right direction is maintained.

In order to fix the first tripod seat unit 2 to the second tripod seat unit 10 by letting the fixing screw 12 be pulled to the right direction, it is not necessary to tighten or loosen the fixing screw 12. Therefore, in this case, it is sufficient that the fixing screw 12 and the fixing key 13 are configured to move integrally in the left and right direction. Thus, the fixing screw 12 and the fixing key 13 may not be configured to be screwed together.

What is claimed is:

1. A mechanism for attaching and detaching a tripod seat, comprising:
   a first tripod seat; and
   a second tripod seat to which the first tripod seat is detachably attached,
   wherein:
   one of the first tripod seat and the second tripod seat has a first fixing member and a second fixing member structured to be screwed together;
   an other of the first tripod seat and the second tripod seat has an attachment part configured to be brought into pressure contact with the second fixing member by screwing the first fixing member to the second fixing member;
   the second fixing member comprises an element distinct from the second tripod seat and has an engagement projection;
   the attachment part has a groove that linearly extends in a first direction and along which the engagement projection is movable, the groove being provided with an engagement groove that extends in a direction transverse to the first direction; and
   the groove guides the engagement projection to move along the groove when the first tripod seat is attached to the second tripod seat;
   wherein, by bringing the attachment part into pressure contact with the second fixing member, the first tripod seat is fixed to the second tripod seat, and
   by guiding the engagement projection into the engagement groove of the groove, the engagement projection engages with the engagement groove and prevents the first tripod seat from falling off the second tripod seat by movement in the first direction.

2. The mechanism for attaching and detaching a tripod seat according to claim 1,
   wherein, by screwing the first fixing member to the second fixing member, the attachment part is fixed such that the attachment part is sandwiched between the second fixing member and the one of the first tripod seat and the second tripod seat.

3. The mechanism for attaching and detaching a tripod seat according to claim 2,
   wherein:
   the attachment part has a dovetail joint; and
   the second fixing member and the one of the first tripod seat and the second tripod seat comprise a dovetail groove into which the dovetail joint is fitted.

4. The mechanism for attaching and detaching a tripod seat according to claim 1,
   further comprising a pressing part configured to press the second fixing member toward the attachment part.

5. The mechanism for attaching and detaching a tripod seat according to claim 1,
   wherein the first tripod seat is configured to be fixed to or detachably attached to one of a lens barrel and an image capturing apparatus.

6. The mechanism for attaching and detaching a tripod seat according to claim 1, the engagement groove comprising a blind groove in a planar surface of the attachment part having a groove section extending in a direction transverse to a major extending direction of the engagement groove, the engagement projection extending in a direction transverse to the planar surface and configured to enter an open portion of the engagement groove and to be movable along the engagement groove and into the groove section.

7. The mechanism for attaching and detaching a tripod seat according to claim 1, the groove having an open portion by which the engagement projection enters the groove, the engagement groove being positioned at an end of the groove opposite the open portion.

8. The mechanism for attaching and detaching a tripod seat according to claim 1, the second fixing member being received and retained in a recess provided in the one of the first tripod seat and the second tripod seat.

9. The mechanism for attaching and detaching a tripod seat according to claim 8, wherein the second fixing member is retained within the recess by a fixing screw having a longitudinal axis that extends transverse to longitudinal axis of the engagement projection.

10. A mechanism for attaching and detaching a tripod seat, comprising:
    a first tripod seat;
    a second tripod seat to which the first tripod seat is detachably attached;
    a fixing member provided for one of the first tripod seat and the second tripod seat, an other of the first tripod seat and the second tripod seat including an attachment part, the fixing member being structured to fix the first tripod seat attached to the second tripod seat, the fixing member comprising an element distinct from the second tripod seat and including an engagement projection; and
    the attachment part has a groove linearly extending in a first direction and along which the engagement projection is movable, the groove being provided with an engagement groove that extends in a direction transverse to the first direction; and
    the groove guides the engagement projection to move along the groove when the first tripod seat is attached to the second tripod seat;
    a falling-off preventing mechanism, comprising the groove and the engagement projection, is configured to prevent the first tripod seat from falling off the second tripod seat when the fixing member does not fix the first tripod seat to the second tripod seat, and
    by guiding the engagement projection into the engagement groove of the groove, the engagement projection engages with the engagement groove and prevents the first tripod seat from falling off the second tripod seat by movement in the first direction,
    wherein the falling-off preventing mechanism is configured to release a state of preventing occurrence of falling-off of the first tripod seat when the fixing member is operated.

11. The mechanism for attaching and detaching a tripod seat according to claim 10,
    wherein:
    the fixing member is a fixing screw having a threaded part;
    the first tripod seat is fixed to the second tripod seat by tightening the fixing screw; and
    by letting the fixing screw move in a axial direction of the fixing screw, the state of preventing occurrence of falling-off of the first tripod seat is released and the first tripod seat becomes detachable from the second tripod seat.

12. The mechanism for attaching and detaching a tripod seat according to claim 11,
wherein:
the one of the first tripod seat and the second tripod seat has an additional fixing member to which the fixing screw is screwed;
the other of the first tripod seat and the second tripod seat has the attachment part configured to be brought into pressure contact with the additional fixing member when the fixing screw is screwed into the additional fixing member; and
by bringing the attachment part into pressure contact with the additional fixing member, the first tripod seat is fixed to the second tripod seat.

13. The mechanism for attaching and detaching a tripod seat according to claim 12,
wherein:
the attachment part has a dovetail joint; and
the additional fixing member and the one of the first tripod seat and the second tripod seat comprise a dovetail groove into which the dovetail joint is fitted.

14. The mechanism for attaching and detaching a tripod seat according to claim 12,
wherein the falling-off preventing mechanism comprises:
the engagement projection provided on the additional fixing member; and
the groove provided on the attachment part to allow the engagement projection to be movable along the groove, the groove including the engagement groove,
wherein:
the groove guides the engagement projection in the groove when the first tripod seat is attached to the second tripod seat; and
when the engagement projection is guided into the engagement groove of the groove, the engagement projection engages with the engagement groove and prevents the first tripod seat from falling off the second tripod seat.

15. The mechanism for attaching and detaching a tripod seat according to claim 10, the engagement groove comprising a blind groove in the attachment part having a groove section extending in a direction transverse to a major extending direction of the engagement groove, the engagement projection extending in a direction transverse to the planar surface and configured to enter an open portion of the engagement groove and to be movable along the engagement groove and into the groove section.

16. A mechanism for attaching and detaching a tripod seat, comprising:
a first tripod seat;
a second tripod seat to which the first tripod seat is detachably attached, one of the first tripod seat and the second tripod seat including an attachment part;
a fixing unit configured to fix the first tripod seat attached to the second tripod seat, the fixing unit comprising an element distinct from the second tripod seat and including an engagement projection; and
the attachment part has a groove linearly extending along a first direction and along which the engagement projection is movable, the groove being provided with an engagement groove the extends in a direction transverse to the first direction; and
the groove guides the engagement projection to move along the groove when the first tripod seat is attached to the second tripod seat;
a falling-off preventing mechanism is configured to prevent the first tripod seat from falling off the second tripod seat when the first tripod seat is attached to the second tripod seat and the fixing unit does not fix the first tripod seat, and
by guiding the engagement projection into the engagement groove of the groove, the engagement projection engages with the engagement groove and prevents the first tripod seat from falling off the second tripod seat by movement in the first direction,
wherein the falling-off preventing mechanism prevents the first tripod seat from falling off the second tripod seat without an operation of the fixing unit when the first tripod seat is attached to the second tripod seat.

17. The mechanism for attaching and detaching a tripod seat according to claim 16, the engagement groove comprising a blind groove in the attachment part having a groove section extending in a direction transverse to a major extending direction of the engagement groove, the engagement projection extending in a direction transverse to the planar surface and configured to enter an open portion of the engagement groove and to be movable along the engagement groove and into the groove section.

18. A mechanism for attaching and detaching a tripod seat, comprising:
a first tripod seat;
a second tripod seat to which the first tripod seat is detachably attached, one of the first tripod seat and the second tripod seat including an attachment part;
a fixing member configured to fix the first tripod seat attached to the second tripod seat, the fixing member comprising an element distinct from the second tripod seat and including an engagement projection; and
the attachment part has a groove that linearly extends in a first direction and along which the engagement projection is movable, the groove being provided with an engagement groove that extends in a direction transverse to the first direction; and
the groove guides the engagement projection to move along the groove when the first tripod seat is attached to the second tripod seat;
a falling-off preventing mechanism is configured to prevent the first tripod seat from falling off the second tripod seat when the fixing member does not fix the first tripod seat to the second tripod seat, and
by guiding the engagement projection into the engagement groove of the groove, the engagement projection engages with the engagement groove and prevents the first tripod seat from falling off the second tripod seat by movement in the first direction,
wherein:
by performing a first operation of the fixing member, fixation of the first tripod seat by the fixing member is released; and
by performing a second operation, distinct from the first operation to the fixing member, prevention of falling-off by the falling-off preventing mechanism is released.

19. The mechanism for attaching and detaching a tripod seat according to claim 18,
wherein:
the fixing member is a fixing screw having a threaded part;
by tightening the fixing screw, the first tripod seat is fixed to the second tripod seat;

the first operation is an operation of loosening the tightened fixing screw; and the second operation is an operation of moving the fixing screw in an axial direction of the fixing screw.

20. The mechanism for attaching and detaching a tripod seat according to claim 18, the engagement groove comprising a blind groove in the attachment part having a groove section extending in a direction transverse to a major extending direction of the engagement groove, the engagement projection extending in a direction transverse to the planar surface and configured to enter an open portion of the engagement groove and to be movable along the engagement groove and into the groove section.

* * * * *